UNITED STATES PATENT OFFICE.

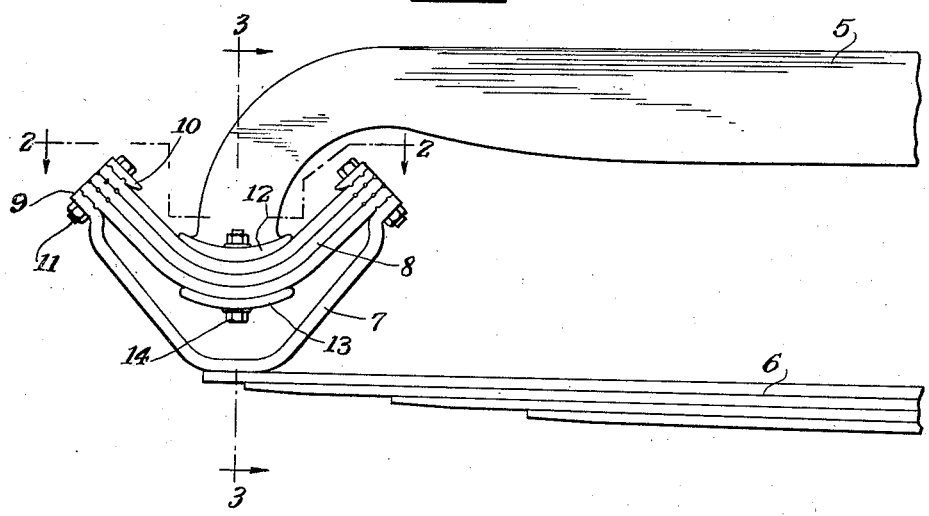
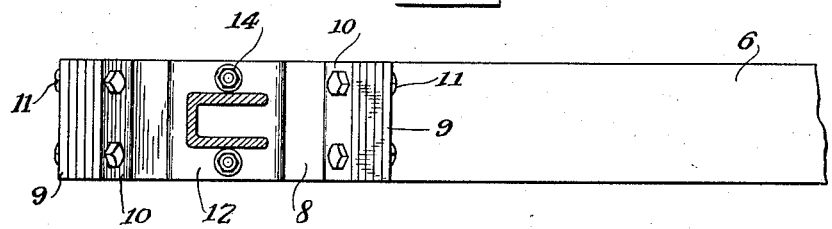
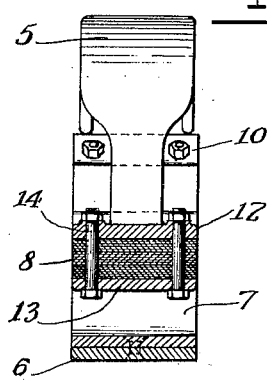

HARVEY W. BELL, OF YONKERS, NEW YORK, ASSIGNOR TO THE BELOYT CORPORATION, OF DOVER, DELAWARE, A CORPORATION OF DELAWARE.

SPRING CONNECTION.

1,427,186. Specification of Letters Patent. Patented Aug. 29, 1922.

Application filed February 4, 1921. Serial No. 442,437.

*To all whom it may concern:*

Be it known that I, HARVEY W. BELL, a citizen of the United States of America, and a resident of Yonkers, Westchester County, and State of New York, have invented certain new and useful Improvements in Spring Connections, of which the following is a specification.

This invention relates to the couplings between the body and running gear of vehicles and particularly to the flexible shackle type of connections disclosed in my co-pending applications.

The objects of the invention are to provide a simple form of connection in which a certain amount of pivotal movement between the parts will be provided for and which will be simple, inexpensive and easily applied to existing constructions.

In the accompanying drawing I have illustrated one of the practical commercial embodiment of the invention, but wish it understood that the structure may be modified without departure from the true spirit and scope of the invention as hereinafter defined and claimed.

In the drawing referred to, Figure 1 is a broken side elevation illustrating the invention used as a front end spring connection.

Figure 2 is a horizontal sectional view as taken on substantially the plane of line 2—2 of Figure 1.

Figure 3 is a vertical sectional view as taken on substantially the plane of line 3—3 of Figure 1.

In this illustration, 5 designates the sill or frame member of the car, and 6 a portion of the front spring.

These parts are connected by means of a substantially V-shaped yoke 7 suitably secured at its lower end to the end of the spring and a flexible bowed link 8 secured at its opposite ends to the arms of the yoke and gripped at its intermediate portion by a clamp carried by the end of the frame member.

The clamps for securing the ends of the link to the yoke are shown in the form of pads 9 at the ends of the yoke arms with which cooperate clamp plates 10, which latter are rigidly secured by suitable bolts 11.

The frame member carries a clamp pad 12 curved to fit the bight of the loop in the link and a cooperating clamp member 13 correspondingly curved to fit the outside of the loop and rigidly secured by bolts or suitable fastenings 14.

The flexible link may be made up of one or a number of layers of material having the characteristics of "thermoid" or rubber impregnated canvas belting, which material is relatively flexible in a transverse plane but is relatively inflexible in its flat plane.

The construction disclosed provides in effect a hinge connection allowing for certain pivotal motions between the end of the spring and the end of the frame, the end of the frame being in effect flexibly "cradled" between the arms of the yoke.

The yoke may be made of spring material and be sufficiently flexible so that the arms may yield toward each other in case of a heavy impact. This cushions the blow somewhat and takes some of the strain off the flexible link, making it possible to use a somewhat lighter construction than would otherwise be the case. If desired, however, the yoke can be constructed absolutely rigid.

What I claim is:

1. The combination with two relatively movable parts of a vehicle, of a yoke secured at its intermediate portion to one of said members, a bowed flexible link rigidly secured at its opposite ends to the arms of the yoke and means for rigidly securing the other member to the body of said bowed link.

2. The combination with two relatively movable parts of a vehicle, of a yoke secured at its intermediate portion to one of said members, a bowed flexible link rigidly secured at its opposite ends to the arms of the yoke and arranged with its bight in between the arms of the yoke and means for rigidly securing the other member in the bight of said bowed link, the arms of the yoke being resilient so that they may yield toward each other.

3. The combination with a vehicle spring, of a yoke rigidly attached at its intermediate portion to said spring, a flexible link rigidly secured at its opposite ends to the arms of said yoke and a frame member rigidly secured to the intermediate portion of said link between the arms of the yoke.

4. In combination with two relatively movable parts of a vehicle, a substantially V-shaped yoke having a base portion at the apex end thereof secured to one of said members, a bowed flexible link secured at its opposite ends to the arms of the yoke and means for rigidly securing the other member to the intermediate portion of said bowed flexible link.

5. In combination with two relatively movable parts of a vehicle, a bowed link of flexible material, a clamp carried by one of the members and having curvilinear clamp plates fitted to the body of the bowed link and means for rigidly securing the opposite ends of the bowed flexible link to the other member aforesaid.

6. In combination with two relatively movable parts of a vehicle, a bowed link of flexible material, a clamp carried by one of the members and having curvilinear clamp plates fitted to the body of the bowed link and means for rigidly securing the opposite ends of the bowed flexible link to the other member aforesaid, including a yoke having spaced arms provided with clamps at the ends thereof inclined to fit the opposite ends of the bowed link.

7. As an article of manufacture, a yoke having an intermediate base portion and spaced arms provided with relatively inclined clamps and a bowed flexible link having its opposite ends rigidly held in said clamps.

8. As an article of manufacture, a yoke having an intermediate base portion and spaced arms provided with relatively inclined clamps, a bowed flexible link having its opposite ends rigidly held in said clamps and another clamp having cooperating curvilinear clamp plates curved to fit the intermediate loop portion of the bowed link.

In witness whereof, I have hereunto set my hand this 2nd day of February, 1921.

HARVEY W. BELL.